United States Patent [19]

Eltze et al.

[11] Patent Number: 4,534,457

[45] Date of Patent: Aug. 13, 1985

[54] MULTI-DISC CLUTCH OR BRAKE WITH A RESILIENT CLAMPING MEANS INSERTABLE BETWEEN A LAMELLA AND THE ASSOCIATED LAMELLA CARRIER

[75] Inventors: Georg Eltze, Stuttgart; Klaus Lüttge, Fellbach; Jürgen Pickard, Wernau; Hans Rübmann; Helmut Sandner, both of Neuhausen, all of Fed. Rep. of Germany

[73] Assignee: Daimler-Benz Aktiengesellschaft, Stuttgart, Fed. Rep. of Germany

[21] Appl. No.: 571,430

[22] Filed: Jan. 17, 1984

[30] Foreign Application Priority Data

Jan. 26, 1983 [DE] Fed. Rep. of Germany ....... 3302430

[51] Int. Cl.³ .......................... F16D 13/52; F16D 3/12
[52] U.S. Cl. ................. 192/70.2; 192/70.19; 192/30 V; 192/115; 188/71.5
[58] Field of Search ....................... 188/218 XL, 71.5; 192/70.19, 70.20, 30 V, 115

[56] References Cited

U.S. PATENT DOCUMENTS

| | | | |
|---|---|---|---|
| 3,494,452 | 2/1970 | Finkin | 192/70.2 |
| 3,680,675 | 8/1972 | Livezey | 192/70.2 |
| 3,760,921 | 9/1973 | Gillespie | 188/218 XL |
| 3,803,872 | 4/1974 | Wolf | 192/70.2 |
| 3,915,272 | 10/1975 | Maurice | 188/71.5 |
| 4,014,619 | 3/1977 | Good et al. | 192/70.2 |
| 4,301,904 | 11/1981 | Ahlen | 192/70.2 |
| 4,425,994 | 1/1984 | Schele | 192/70.2 |
| 4,478,324 | 10/1984 | Sink | 192/30 V |
| 4,479,569 | 10/1984 | Kummer et al. | 192/70.2 |

Primary Examiner—Henry C. Yuen
Attorney, Agent, or Firm—Craig & Burns

[57] ABSTRACT

In a multi-disc clutch or brake, several lamellae in the form of annular discs cannot only be fixed essentially non-rotatably, relative to a lamella carrier fixed in terms of rotation in relation to one of the two clutch or brake parts, by means of a releasable positive connection but can also each be supported radially exclusively at an individual point on the lamella carrier, each by means of its own resilient clamping means, the clamping means being retained on the lamella carrier. At least one central annular gap located, in the peripheral direction of the axis of rotation, between two engaging teeth of the positive connection and open in the two directions of the axis of rotation is limited radially in one directions by a cylindrical shell portion of a lamella and in the other direction by a cylindrical shell portion of the lamella carrier. The engagement surface of the clamping means, used for the purpose of support, is located in the annular gap and interacts with the shell portion of the lamella. So that even thinner lamellae can be used, the two clamping means for two lamellae succeeding one another in the directions of the axis of rotation are arranged on different legs of a comb-shaped holder. Each leg of the holder can be inserted into a separate annular gap.

20 Claims, 6 Drawing Figures

4,534,457

MULTI-DISC CLUTCH OR BRAKE WITH A RESILIENT CLAMPING MEANS INSERTABLE BETWEEN A LAMELLA AND THE ASSOCIATED LAMELLA CARRIER

TECHNICAL FIELD

The invention relates to a clutch or brake.

BACKGROUND ART

In clutches or brakes of this type, the function of the resilient clamping means is to prevent loose lamellae from rattling disturbingly during idle.

In a known clutch of this type, German Patent Specification No. 681,145, a ball which is supported against the lamella carrier via a helical spring and which rests against the particular shell portion of the lamella is used as a resilient clamping means both for inner lamellae and outer lamellae. The spring/ball clamping elements for all the lamellae connected positively to the particular lamella carrier are arranged in a plane containing the axis of rotation of the clutch, in such a way that the geometric location for all the balls is a straight line parallel to the axis of rotation. Such a design of the clamping means is therefore suitable only for clutches or brakes with relatively thick lamellae.

The object on which the invention is based is essentially to make it possible to use thin lamellae in a clutch or brake.

In a known multi-disc clutch of a different generic type, German Offenlegungsschrift No. 2,152,674, all the inner lamellae are connected to one another by means of four bar-shaped and toothed elastic intermediate members retained in axial grooves of the inner-lamellae carrier. This is done in a way that when one of the inner lamellae starts to lean or tilt or when axial knocking or noisy running occurs on one of the inner lamellae in another way, such a phenomenon occurs simultaneously and in an equivalent manner on all the inner lamellae. This is intended to cause a fluttering form of vibration. It is possible to control and damp this vibration by means of the divided outer lamellae. Because centrifugal force is exerted on the outer lamellae, the halves of the outer lamellae are pressed radially outwards and friction is generated as a result of this displacement.

In a further known multi-disc clutch of a different generic type, German Patent Specification No. 675,794, the inner lamellae and the outer lamellae are mounted on the associated lamella carrier by means of rubber feather-edge wedges to prevent disturbing rattling noises.

These and other objects, features and advantages of the present invention will become more apparent from the following description when taken in connection with the accompanying drawing which shows, for purposes of illustration only, one embodiment in accordance with the present invention.

BRIEF DESCRIPTION OF THE DRAWINGS

Referring now to the drawing wherein like reference numerals are used throughout the various views to designate like parts

DESCRIPTION OF THE INVENTION

Figure 1:
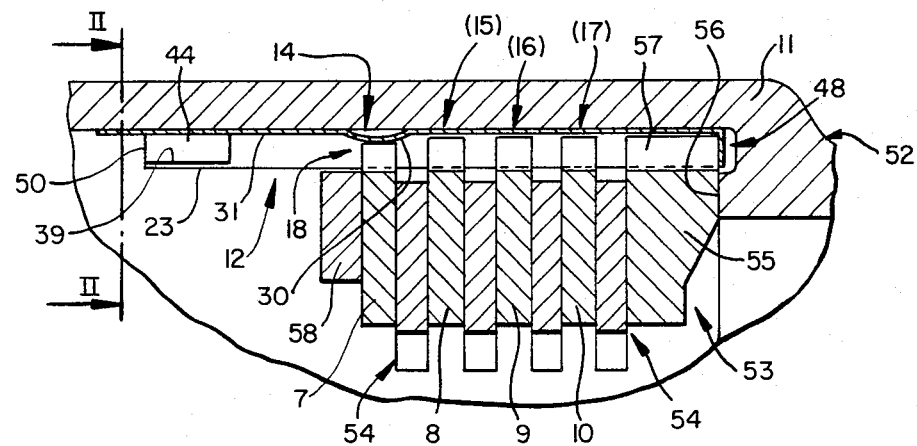
FIG. 1 shows a partial section through a gear brake according to the invention, belonging to an automatic gear-change transmission of a motor vehicle, in a plane containing the axis of rotation and extending along the line I—I of FIG. 2.
Figure 2:
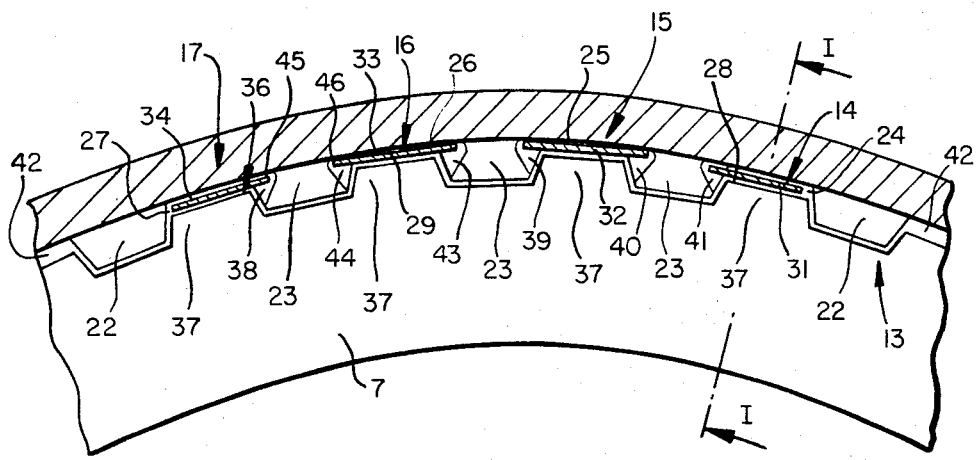
FIG. 2 shows a partial section through the gear brake of FIG. 1 in a plane perpendicular to the axis of rotation along the line II—II of FIG. 1.
Figure 3:
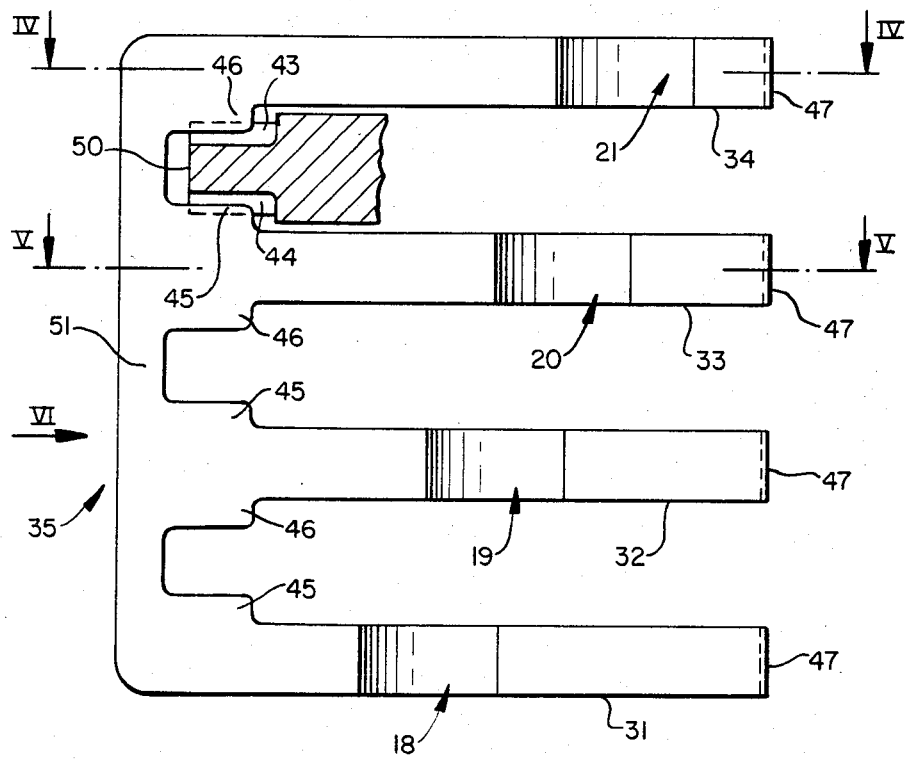
FIG. 3 shows, in a developed plan view, the holder used in the gear brake of FIGS. 1 and 2.
Figure 4:
FIG. 4 shows a section through the holder of FIG. 3 along the line IV—IV.
Figure 5:
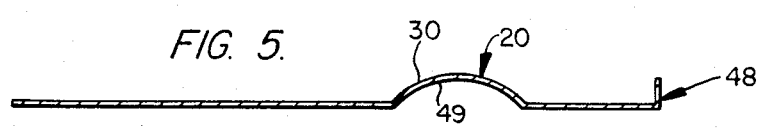
FIG. 5 shows a section through the holder of FIG. 3 along the line V—V.

A portion 11 of a gearbox 52 of an automatic gear-change transmission is used as a lamella carrier 12 for the four outer lamellae 7 to 10 of a gear brake 53. For this purpose, the portion is provided on the inner periphery with axial engaging grooves 42. The grooves are open at one end 50 and engage teeth 37 on the outer periphery of the lamellae 7 to 10. The result is that a positive connection 13 between the lamellae and the lamella carrier is produced.

Inner lamellae 54 engage in a conventional way respectively between the outer lamellae 7 to 10 and are fixedly, rotationally connected via an associated lamella carrier to the gear member which is to be braked. The connection is depicted in the drawings. A thrust ring 55 inserted into the engaging grooves 42 by means of corresponding engaging teeth 57 is used as an axial abutment for the lamellae. The thrust ring is itself supported on an inner extension 56 of the gearbox 52. The foremost lamella 7 has located in front of it, to compensate for tolerances, an intermediate ring 58 via which the set of lamellae is actuated by means of the working piston of a pressure-medium switch control element.

Shell surfaces 28 limit the heads 36 of the engaging teeth 37 of the lamellae 7 to 10. The radially opposite shell surfaces 29 of the gearbox wall 11 enclose annular gaps 24 to 27. Each of the gaps engage a leg 31 to 34 of a comb-shaped holder 35.

To form resilient clamping means 18 to 21, each of the legs 31 to 34 of the holder 35, designed as a one-part sheet-metal pressing, is provided with a curved partial cross-section 49. The convex engagement surface 30 of which is located respectively in one of the annular gaps 24 to 27 and engages on the respective shell surface 28 of one of the lamellae 7 to 10.

The clamping means 18 to 21 are thus arranged at points 14 to 17 on the lamella carrier 12. The clamping means are offset relative to one another both in the directions of the axis of rotation, corresponding to the distances between the lamellae 7 to 10, and in the peripheral directions, corresponding to the division of the positive connection 13. This permits use of lamellae as thin as desired.

The engaging grooves 42 enclose between them engaging teeth 22. The three engaging teeth 23 located between the legs 31 to 34 have, at their open assembly ends 50, undercuts 43 and 44 in the groove side-walls 40 and 41, to obtain extensions 38 and 39 for radially fixing the holder 35. For this purpose, the holder 35 is provided in the region of the transitions between the legs 31 to 34, on the one hand, and the transverse web 51 connecting the legs to one another, on the other hand, with projecting portions 45 and 46 which engage into the undercuts 43 and 44.

To fix the holder 35 of the direction of the axis of rotation pointing from the intermediate ring 58 to the thrust ring 55, either the end 50 of the engaging grooves 42 in conjunction with the transverse web 51 or the undercuts 43 and 44 in conjunction with the portions 45 and 46 can be used.

To fix the holder 35 in the other direction of the axis of rotation, the legs 31 to 34 engage over the entire set of lamellae, including the thrust plate 55. An anchoring part 48 engaging behind the thrust plate 55 is provided at the free end 47 of each of the legs to fix the holder.

Because the annular gaps 24 to 27 located outside the lamellae 7 to 10 are used between the tooth heads 36 and the shell surfaces 29 of the lamella carrier 12, which lie on the groove bottom, the holder 35 is located radially outside the space through which the working piston travels.

The holder 35 ensures that the resilient clamping means 18 to 21 are assembled simply and without the risk of dislocation.

As a result of the holder 35, the resilient clamping means 18 to 21 can be used both in new gear constructions and subsequently in existing standard designs.

The holder 35 is simple and cheap to produce.

Figure 6:
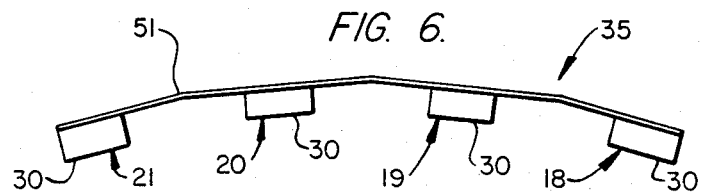
FIG. 6 shows a view of the holder of FIG. 3 in the direction of the arrow VI, on a full size scale.

Instead of the curved form illustrated in FIG. 6, the holder 35 or its transverse web 51 can also be made flat.

The spring force is such that the lamellae are on the one hand fixed radially, but on the other hand separate perfectly from one another and adjust to an equal distance between them when the clutch or brake is not being actuated.

While we have shown and described one embodiment in accordance with the present invention, it is understood that the same is not limited thereto but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A multi-disc clutch or brake, comprising several lamellae in the form of annular discs operable to be essentially non-rotatably fixed, relative to a lamella carrier which is fixed in terms of rotation in relation to one of two clutch or brake parts, by means of a releasable positive connection, and in which each disc is radially supported on the lamella carrier exclusively at an individual point by means of its own resilient clamping means having an engagement surface, the clamping means being retained on the lamella carrier, at least one annular gap being provided which is located, in the peripheral directions of the axis of rotation, between two engaging teeth of the positive connection and is open in the two directions of the axis of rotation, said gap being limited radially in one direction by a cylindrical shell portion of a lamella and in the other direction by a cylindrical shell portion of the lamella carrier, the engagement surface of the clamping means, which is operable as support, being located in the annular gap and cooperates with the shell portion of the lamella, and a comb-shaped holder means having several legs, two clamping means for two lamellae succeeding one another in the directions of the axis of rotation being arranged on different legs of the holder means, and each leg of the holder means being operable to be inserted into a separate annular gap.

2. The clutch or brake according to claim 1, wherein each leg includes only clamping means for one lamella.

3. The clutch or brake according to claim 2, wherein the number of legs is equal to the number of lamellae.

4. The clutch or brake according to claim 3, wherein the holder means is constructed as a one-part sheet-metal stamping.

5. The clutch or brake according to claim 4, wherein the annular gaps associated with the legs are located radially outside the lamellae.

6. The clutch or brake according to claim 5, wherein the shell portion, limiting the annular gap, of the lamella is located on the head of an engaging tooth of the positive connection.

7. The clutch or brake according to claim 6, wherein the lamella carrier includes at least two extensions extending in the peripheral direction for fixing the holder means radially.

8. The clutch or brake according to claim 7, wherein groove side-walls of axially extending engaging grooves of the positive connection are undercut to form the extensions and the holder means has portions engaging the undercuts.

9. The clutch-or brake according to claim 8, wherein at least one of the legs engages over all the lamellae in the directions of the axis of rotation and has at its free end an anchoring part perpendicular to the axis of rotation.

10. The clutch or brake according to claim 9, wherein a curved partial cross-section of the leg is used as a clamping means.

11. The clutch or brake according to claim 10, wherein the undercuts are located at the open assembly end of the engaging grooves for insertion of the lamellae.

12. The clutch or brake according to claim 11, wherein the portions of the holder means engaging into the undercuts are each located in the region of transition between a leg and a transverse web of the holder means connecting all the legs to one another.

13. The clutch or brake according to claim 1, wherein the number of legs is equal to the number of lamellae.

14. The clutch or brake according to claim 1, wherein the holder means is constructed as a one-part sheet-metal stamping.

15. The clutch or brake according to claim 1, wherein the annular gaps associated with the legs are located radially outside the lamallae.

16. The clutch or brake according to claim 1, wherein the lamella carrier includes at least two extensions extending in the peripheral direction for fixing the holder means radially.

17. The clutch or brake according to claim 1, wherein groove side-walls of axially extending engaging grooves of the positive connection are undercut to form the extensions and the holder means has portions engaging the undercuts.

18. The clutch or brake according to claim 17, wherein the undercuts are located at the open assembly end of the engaging grooves for insertion of the lamellae.

19. The clutch or brake according to claim 17, wherein the portions of the holder means engaging into the undercuts are each located in the region of transition between a leg and a transverse web of the holder means connecting all the legs to one another.

20. The clutch or brake according to claim 1, wherein a curved partial cross-section of the leg is used as a clamping means.

* * * * *